United States Patent
Katzer et al.

(10) Patent No.: US 7,992,154 B1
(45) Date of Patent: Aug. 2, 2011

(54) REMOTE METHOD INVOCATION USING A SERVER PROXY OBJECT

(75) Inventors: Robin D. Katzer, Olathe, KS (US); James D. Barnes, Overland Park, KS (US); Sanjay K. Sharma, Olathe, KS (US); Michael A. Gailloux, Overland Park, KS (US)

(73) Assignee: Sprint Communications Company L.P., Overland Park, KS (US)

( * ) Notice: Subject to any disclaimer, the term of this patent is extended or adjusted under 35 U.S.C. 154(b) by 939 days.

(21) Appl. No.: 11/364,253

(22) Filed: Feb. 28, 2006

(51) Int. Cl.
*G06F 9/46* (2006.01)
*G06F 15/16* (2006.01)

(52) U.S. Cl. .................. 719/315; 709/203; 719/330

(58) Field of Classification Search ............... 455/556.2; 719/315, 330–332; 709/203
See application file for complete search history.

(56) References Cited

U.S. PATENT DOCUMENTS

| | | | | |
|---|---|---|---|---|
| 6,134,603 A * | 10/2000 | Jones et al. | ................. | 719/330 |
| 6,629,154 B1 * | 9/2003 | Jones et al. | ................. | 719/330 |
| 7,467,389 B2 * | 12/2008 | Mukkamala et al. | ......... | 719/316 |
| 2003/0233465 A1 * | 12/2003 | Le et al. | ................. | 709/231 |
| 2005/0160434 A1 * | 7/2005 | Tan et al. | ................. | 719/331 |
| 2006/0026552 A1 * | 2/2006 | Mazzitelli et al. | ............ | 717/101 |
| 2007/0011691 A1 * | 1/2007 | Herta | ................. | 719/330 |

OTHER PUBLICATIONS

"Remote Method Invocation," Enterprise Java World, http://www.enterprisejavaworld.com/java/rmi.html, Feb. 7, 2006, pp. 1-16.
Ortiz, Enrique C., "An Introduction to Java Card Technology—Part 2, The Java Card Applet," Sep. 2003, 16 pages.
"The SATSA-JCRMI Optional Package," Chapter 4, SATSA Developer's Guide, SATSA References Implementation 1.0, Dec. 2004, 4 pages.
Chinnici, Roberto, "Java™ API for XML-based RPC JAX-RPC 1.1," JSR—101, Java Community Process (JCP), Sun Microsystems, Inc., Maintenance Release, Version 1.1, Oct. 14, 2003, 167 pages.

* cited by examiner

*Primary Examiner* — H. S. Sough
*Assistant Examiner* — Charles E Anya

(57) ABSTRACT

A communication device comprises a processor, a server proxy object accessible to the processor, and an object-oriented application that runs on the processor. The application requests a service from the server proxy object. The server proxy object generates a packet that contains an identity of the requested service. The service identity is converted into a corresponding method by a remote computer such that the server proxy object need not change if the corresponding method changes on the remote computer.

18 Claims, 2 Drawing Sheets

REMOTE METHOD INVOCATION USING A SERVER PROXY OBJECT

CROSS-REFERENCE TO RELATED APPLICATIONS

None

STATEMENT REGARDING FEDERALLY SPONSORED RESEARCH OR DEVELOPMENT

Not applicable.

REFERENCE TO A MICROFICHE APPENDIX

Not applicable.

FIELD

The present disclosure is generally directed to a technique for remote method invocation, and more particularly to a client causing a method to be invoked on a remote computer without the client having information about the identity of the method.

BACKGROUND INFORMATION

A computing or communication device (e.g., cellular telephone) typically executes code. Such code often comprises object-oriented applications such as JAVA applications. Object-oriented applications generally comprise one or more methods and one method can invoke another method.

Situations may exist in which it would be desirable to have a method executing on such a device to invoke a method executing on another device. For example, a cellular telephone user's account information (e.g., minutes used) may be stored on a server, but such information may be desired to be accessed by the user of the telephone. Present protocols generally do not readily permit a wireless device such as a cellular telephone to invoke a method present on a different system (e.g., a server).

SUMMARY

According to one embodiment, the present disclosure is directed to a communication device comprising a processor, a server proxy object accessible to the processor, and an object-oriented application that runs on the processor. The application requests a service from the server proxy object. The server proxy object generates a packet that contains an identity of the requested service. The service identity is converted into a corresponding method by a remote computer such that the server proxy object need not change if the corresponding method changes on the remote computer.

According to another embodiment, the present disclosure is directed to a system that comprises a computer and a communication device. The communication device operatively communicates with the computer. At least one method executes on an object on the computer. The communication device invokes a service on a server proxy object. The server proxy object generates a packet to be sent to the computer. The packet contains an identity of the service. The computer receives the packet, extracts the service identity from the packet, and determines the method to be invoked corresponding to the service identity.

In accordance with yet another embodiment, a method comprises receiving a packet from a wireless communication device. The packet contains a service identity. The method further comprises determining a method that corresponds to the service identity. The method also comprises invoking the determined method.

These and other features and advantages will be more clearly understood from the following detailed description taken in conjunction with the accompanying drawings and claims.

BRIEF DESCRIPTION OF THE DRAWINGS

For a more complete understanding of the present disclosure and the advantages thereof, reference is now made to the following brief description, taken in connection with the accompanying drawings and detailed description, wherein like reference numerals represent like parts.

DETAILED DESCRIPTION OF THE PREFERRED EMBODIMENTS

Figure 1:
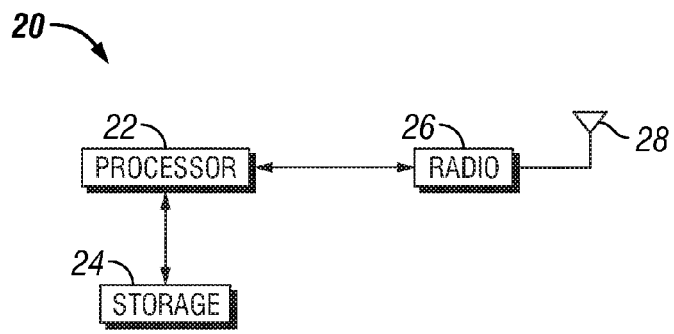
FIG. 1 is a block diagram that depicts a telecommunication system having at least a communication device and a computer in accordance with various embodiments of the invention.

It should be understood at the outset that although an exemplary implementation of one embodiment of the present invention is illustrated below, the present system may be implemented using any number of techniques, whether currently known or in existence. The present disclosure should in no way be limited to the exemplary implementations, drawings, and techniques illustrated below, but may be modified as desired and as would be understood by one of ordinary skill in the art.

In accordance with various embodiments of the invention, a communication system comprises a client device that executes code contained thereon and is adapted to communicate with a computer (e.g., a server). The client device can be implemented as any of a variety of devices. In accordance with a preferred embodiment, the client device is implemented as a communication device such as wireless handset (e.g., cellular telephone, personal data assistant (PDA), etc.). In general, the client device may be mobile or non-mobile and provide cellular telephone capability or not.

The code executed on the client device comprises at least one object-oriented application (e.g., a JAVA application). As noted above, object-oriented applications typically comprise multiple methods and one method can invoke another method. JAVA applications run within the confines of a "virtual machine." A complication arises when a target method to be invoked is provided on a separate "virtual machine." For example, JAVA code running on a wireless handset may benefit from accessing the user's account information on a remote server. The user's wireless handset and the server comprise two separate virtual machines for the object-oriented code running on each. A JAVA platform usable for wireless handsets is "J2ME." It has been recognized that the J2ME platform generally does not support Remote Method Invocation (RMI).

The present disclosure is directed to a technique to make it possible for a device on which an object-oriented application executes and that does not otherwise support RMI to cause a method to be invoked on a remote computer. A "server proxy object" on the device determines that the object-oriented application is trying to access a service, that happens to be provided on a remote computer, and provides an interface between the object-oriented application on the client device and the targeted service on the remote computer. The process by which this happens is such that through the server proxy object, the client's application causes a method to be invoked on the remote computer without the client having knowledge of the identity of the particular method(s) being invoked. The client's application targets a specific service, possibly from among a plurality of selectable services. The term "service" broadly refers to a function that can be performed by the remote computer, but is not the identity of a specific method (in the context of object-oriented applications) that performs the specified service. The server proxy object generates a packet that contains, possibly among other information, an identity of the target service. Upon receipt of the packet, the server extracts the identity of the targeted service from the packet and uses the service identity to determine which method(s) to invoke to perform the requested service.

As explained above, the preferred implementation is such that the client device on which the object-oriented application executes need not know the identity of the particular method being invoked. In such embodiments, the remote computer's methods can be altered and no corresponding modifications to the client device's application or server proxy object need be made.

FIG. 1 illustrates a hardware system 20 that can be used, with regard to FIG. 2, to implement either or both of the client device 30 and server 40 discussed below. As shown in FIG. 1, the hardware system 20 comprises a processor 22 operatively coupled to storage 24. The storage 24 comprises any suitable type of storage such as volatile memory or non-volatile storage, or a combination of both. An example of volatile memory includes random access memory (RAM). Examples of non-volatile storage include a hard disk drive, read only memory (ROM), compact disk read only memory (CD ROM), electrically erasable programmable read only memory (EEPROM), Flash memory, etc. Embodiments of the client device 30 in which the client device functions as a communication device may also comprise a radio 26 and an antenna 28.

Figure 2:
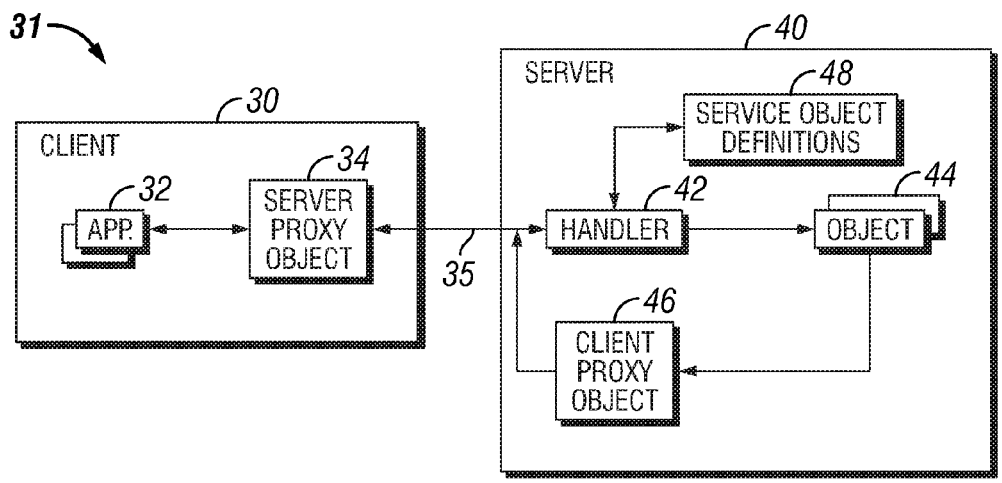
FIG. 2 shows a block diagram of a device in accordance with various embodiments of the invention.

FIG. 2 shows an illustrative communication system 31 comprising the client device 30 that operatively communicates with the server 40 via communication link 35. The client device 30 comprises one or more object-oriented applications 32 and a server proxy object 34. In some embodiments, the server proxy object 34 is provided within an application 32, while in other embodiments, the server proxy object 34 is provided separate from the applications 32. The server 40 comprises a handler 42, service objects 44, a client proxy object 46, and service object definitions 48.

As a wireless handset, the client device 30 may comprise a cellular telephone, combination of a cellular telephone and personal data assistant (PDA), and the like. In at least some embodiments, the client device 30 may be mobile, although in other embodiments, the client device need not be mobile. Although a single server 40 is shown, more than one server 40 may be provided as desired. The server 40 may function as a back-end server and load balancers, routers, switches, and the like may also be included in the system 31. In the context of a cellular system, the communication link 35 comprises the wireless medium, one or more base stations and other communication infrastructure that facilitates communication between the client device 30 and server 40.

In some embodiments, the application 32 and server proxy object 34 on communication device 30 comprises software that is stored in storage 24 and executed by processor 22. Similarly, the handler 42, service object 44 and client proxy object 46 on the server 40 also comprise software stored on storage 34 and executed by processor 22. In other embodiments, one or more of the application 32, proxy objects 34 and 44, handler 42, and service object 44 may comprise hardware or a combination of hardware and software.

Each application 32 performs one or more functions characteristic of the client device 30. In embodiments in which the client device 30 comprises a wireless handset, an application 32 may provide (e.g., display) account information such as minutes used, minutes remaining, etc. to the user of the device. In some embodiments, such account information is stored on, or otherwise accessible via, the server 40. Accordingly, the client device 30 interacts with the server 40 to access such information and provide it to the device's user.

Preferred embodiments of the invention include a mechanism by which an object-oriented application 32 executing on the client communication device 30 desires to cause a particular action to be performed on the server 30 such as initializing a communication connection, retrieving account information, etc. The application 32 executing on the client device 30 need not know the identity of the particular methods executing on the server 40 to have one or more of such methods invoked. Instead, the application 32 and/or the server proxy object 34 provide an identity of a service to be performed, or otherwise accessed, on the server 40. Examples of such services include retrieving account information for a particular multiple directory number (MDN) and initializing a connection between the client device 30 and server 40. Services are generically specified that are typical of the types of functionality the client device 30 may desire of the server 40. The service identify is provided by the client's server proxy object 34 to the server 40 and, based on the identity of the target service, the server determines the method(s) that are to be invoked to implement the target service.

Figure 3:
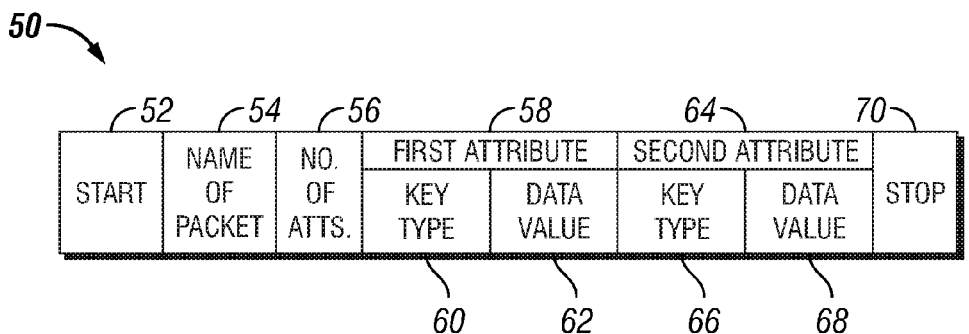
FIG. 3 shows in illustrative format for a packet transmitted by the telecommunication system.

The server proxy object 34 generates a data structure (broadly termed a "packet" in this disclosure) that includes the identity of the target service along with, if applicable, one or more arguments. An argument comprises, for example, a data value that is used by the server's invoked methods that correspond to the target service. In at least some embodiments, the packet is included within a HyperText Transport Protocol (HTTP)-based communication link as a byte array. FIG. 3 shows an illustrative format for a packet 50. The packet 50 preferably comprises fields 52, 54, 56, 58, 64 and 70. In some embodiments, the packet 50 comprises a hash table. Field 52 comprises a start byte (e.g., the value "11") and field 70 comprises a stop byte (e.g., the value "12") to designate the beginning and ending of the packet.

Field 54 contains a byte string that represents the name or other identifying value of the packet. The byte string contained in field 54 preferably is predetermined and known to both the client device 30 and server 40. In at least some embodiments, each byte value in a byte string, such as the string in field 54, contains an American Standard Code for Information Interchange (ASCII) code for a corresponding alphanumeric character. Thus, field 54 contains a byte string that contains an ASCII code for each character in the name of the packet. Each string of ASCII byte codes (in field 54 and other fields in packet 50), may be prepended with a value that specifies the length of the subsequent ASCII code byte string.

Field 56 indicates the number of attributes that follow field 56. In the illustrative embodiment of FIG. 3, the packet 50 comprises two attributes 58 and 64 and thus field 56 includes a value of "2." The attributes 58 and 64 include a first attribute and a second attribute as shown. Each attribute comprises a "key type" and a corresponding data value. First attribute 58 includes a key type 60 and a data value 62, while second attribute 64 includes a key type 66 and data value 68. While some key types have data values, not all key types have corresponding data values. In this latter case, the data value field contains no data and thus the field may be non-existent.

The first attribute 58 preferably identifies the service targeted by the application 32. The key type 60 of the first attribute 58 comprises a predetermined byte string corresponding to "ServiceName" or other value indicating that the first attribute comprises an identity of the targeted service. The data value 62 includes the identity of the service itself. An example of such a service identity is a byte string that corresponds to "InitConnection," which specifies a service that initializes a connection between the server 40 and the client device 30. In other examples, the service identity data value 62 comprises a byte string corresponding to a service that retrieves the user's account information (e.g., minutes used, etc.).

The second attribute 64 includes arguments, if any, for the service identified in the first attribute 58. The key type field 66 comprises a predetermined byte string corresponding to "Data" or another value indicating that the second attribute comprises a data argument for the service. The data value 68 comprises the data argument itself. Some services need no data arguments. The service that initializes the connection (InitConnection) is an example of a service that requires no arguments. In the case of InitConnection, the data value field 68 remains unpopulated. A service that retrieves the user's account information, however, is an example of a service that uses a data argument—the user's MDN number. In some embodiments, the data value field 68 may comprise an entire other hash table which specifies another service and arguments. In such embodiments, hash tables are nested.

Referring still to FIG. 2, the packet generated by the server proxy object 34 is transmitted across the communication link 35 to the server's handler 40. The handler 42 extracts the attributes from the packet and determines the service being requested by the client's application 32. The handler 42 also determines one or more methods (object-oriented code) to invoke to perform the requested service by accessing the service object definitions 48. The service object definitions 48 comprise a data structure that specifies the services accessible by the client devices and, for each service, the method(s) that perform the service and the object on which each method is to be invoked. The method(s) to be invoked are performed on objects 44.

Although the client applications 32 cause methods to be invoked on the server via passing the client a service identity, the methods invoked by the handler 42 are generally not known to the client applications 32. The client's applications 32 and/or server proxy object 34 thus need not be changed if a method or object 44 on the server changes. Although the client devices 30 are not limited to wireless handsets, avoiding the need to change the client's applications 32 and/or server proxy object 34 is particularly desirable for mobile wireless handsets, the users of which generally have little desire, time and/or inclination to download software modifications to their handsets. Moreover, changes (e.g., improvements) can be made at the servers 40 in a way that is transparent to the users of the client devices 30.

A method invoked by the handler 42 may result in data to be communicated back to the client communication device 30. Such data can be provided to the client proxy object 46. The client proxy object 46 generates a packet of the same or similar format as that shown in FIG. 3. The service identity field 62 can be any value (e.g., a predetermined value) as in at least some embodiments, the client 30 has no services to be performed at the request of the server 40. The second attribute 64, and specifically the data value field 68, includes the response data to be provided to the client device 30. The client's server proxy object 34 receives the packet, retrieves the data included therein, and provides the data to the appropriate application 32.

Figure 4:
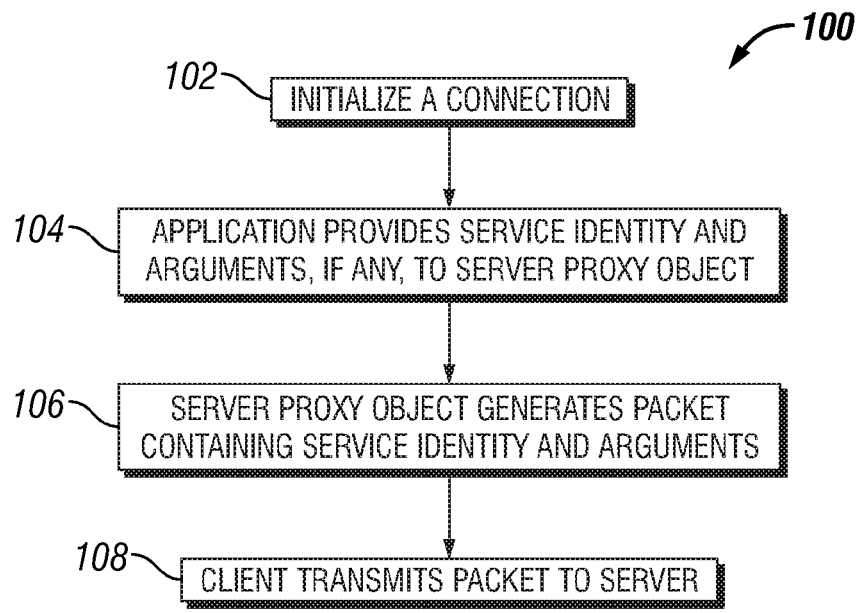
FIG. 4 shows an illustrative method implemented on a handset in accordance with various embodiments of the invention.
Figure 5:
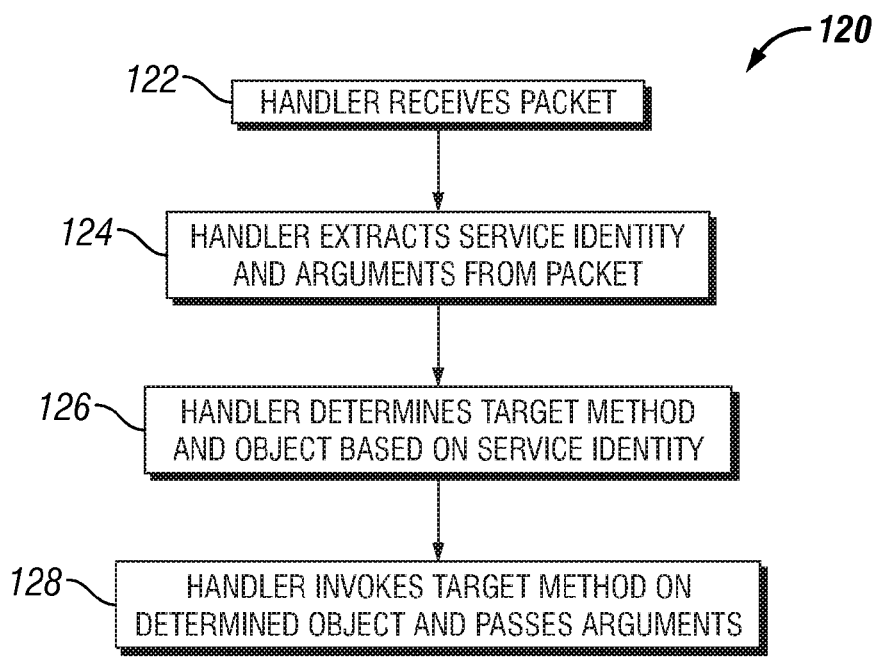
FIG. 5 shows an illustrative method implemented on a computer located remote from the handset in accordance with various embodiments of the invention.

FIGS. 4 and 5 show illustrative embodiment of a method 100 (FIG. 4) and a method 120 (FIG. 5). Method 100 is directed to the client device 30 generating and providing a packet to the server 40. Method 120 illustrates how the server processes the packet. Method 100 comprises actions 102-108 and method 120 comprises actions 122-128. The order of the actions can be varied from that shown in FIGS. 4 and 5 and two or more of the actions can be combined into a single action as desired.

Referring to FIG. 4, method 100 begins with action 102 in which the client device 20 initializes a communication connection to the server 40. This action includes, for example, establishing an HTTP connection. At 104, an application 32 provides an identity of a target service and, if applicable, arguments to the server proxy object 34. At 106, the server proxy object 34 generates a packet, such as that shown in FIG. 3, containing the service identity and arguments, if any. The client device 30 then transmits the packet to the server (108) over the communication link 35.

Referring now to FIG. 5, method 120 begins with the server's handler 42 receiving the packet generated by the server proxy object 34 (122). The handler then extracts the service identity from field 62 and, if present, arguments from field 68 (124). At 126, the handler determines the target method(s) to be invoked and object(s) based on the service identity from the packet. The handler 42 then invokes the targeted method(s) at 128.

While various embodiments have been provided in the present disclosure, it should be understood that the disclosed systems and methods may be embodied in many other specific forms without departing from the spirit or scope of the present disclosure. The present examples are to be considered as illustrative and not restrictive, and the intention is not to be limited to the details given herein, but may be modified within the scope of the appended claims along with their full scope of equivalents. For example, the various elements or components may be combined or integrated in another system or certain features may be omitted, or not implemented. Also, techniques, systems, subsystems and methods described and illustrated in the various embodiments as discrete or separate may be combined or integrated with other systems, modules, techniques, or methods without departing from the scope of the present disclosure. Other items shown or discussed as directly coupled or communicating with each other may be coupled through some interface or device, such that the items may no longer be considered directly coupled to each other but may still be indirectly coupled and in communication, whether electrically, mechanically, or otherwise with one another. Other examples of changes, substitutions, and alterations are ascertainable by one skilled in the art and could be made without departing from the spirit and scope disclosed herein.

What is claimed is:

1. A device, comprising:
a processor;
a server proxy object accessible to said processor; and
an object-oriented application that runs on said processor, said object-oriented application requests a service from said server proxy object and said server proxy object generates a packet that contains an identity of said requested service that refers to a function to be performed by a remote computer, wherein said packet includes a hash table and does not contain an identity of one or more corresponding methods that are executed to perform said function said requested service on said remote computer, and wherein the identity of the requested service is independent of the identity of the one or more corresponding methods; and
wherein said service identity is used by said remote computer to determine an identity of said one or more corresponding methods from said service identity and to invoke said corresponding one or more methods for execution on said remote computer to perform said function, wherein said server proxy object need not change and the identity of said requested service need not change if one or more of said corresponding one or more methods change on said remote computer.

2. The device of claim 1 wherein said packet comprises a byte array, said byte array comprising said service identity.

3. The device of claim 1 wherein said packet also comprises an argument associated with said requested service.

4. The device of claim 1 wherein said hash table containing a first attribute, said first attribute including the identity of the requested service.

5. The device of claim 4 wherein said hash table also contains a second attribute, said second attribute including an argument used by at least one of said corresponding plurality of methods.

6. The device of claim 1 wherein said device comprises a mobile device.

7. The device of claim 1 wherein said device comprises a communication device.

8. The device of claim 1 wherein said object-oriented application does not have access to an identity of said corresponding plurality of methods.

9. The device of claim 1 wherein the one or more corresponding methods that are executed to perform the function of the requested service on the remote computer comprises a plurality of methods.

10. A system, comprising:
a server computer on which at least one method is executable;
a communication device that operatively communicates with said server computer and that invokes a service on a server proxy object, said server proxy object generates a packet to be sent to said server computer, said packet includes a hash table and contains an identity of said service that refers to a function to be performed by said server computer through the execution of said at least one method, wherein said packet does not contain an identity of said at least one method, wherein the identity of said service is independent of said at least one method, and wherein the identity of said service need not change if said at least one method changes on said server computer; and
wherein said server computer receives said packet, extracts said service identity from the packet, and determines the identity of said at least one method to be invoked for execution by said computer to perform said function corresponding to said service identity.

11. The system of claim 10 wherein said communication device comprises a mobile device.

12. The system of claim 10 wherein said packet comprises the service identity and an argument, and said computer invokes said at least one method using said argument.

13. The system of claim 12 wherein said computer can be modified to determine a different method to correspond to said service identity without requiring modification of any software on the communication device.

14. The system of claim 12 wherein said computer accesses a data structure to determine the at least one method to be invoked based on the service identity.

15. The system of claim 10 wherein the at least one method comprises a plurality of methods.

16. A method, comprising:
receiving a packet from a wireless client device by a server computer, said packet containing a hash table with a service identity that refers to a function to be performed by the computer, wherein said packet does not contain an identity of a plurality of methods that correspond said service identity that are executable to perform said function, wherein said service identity is independent of said identity of the plurality of methods, and wherein said service identity need not change if one of said plurality of methods that correspond to said service identity changes on computer;
determining said plurality of methods that correspond to said service identity by said server computer; and
invoking, on said server computer, said plurality of methods identified by said server computer to perform said function.

17. The method of claim 16 further comprising generating a packet containing a response from the invoked methods and transmitting the packet to the wireless client device.

18. The method of claim 16 further comprising, on behalf of an object-oriented application, a server proxy object on the wireless client device generating the packet containing the service identity.

* * * * *